US012633703B2

(12) United States Patent
Saito et al.

(10) Patent No.: US 12,633,703 B2
(45) Date of Patent: May 19, 2026

(54) LEVER-TYPE CONNECTOR

(71) Applicant: SUMITOMO WIRING SYSTEMS, LTD., Mie (JP)

(72) Inventors: Sho Saito, Mie (JP); Yuki Kondo, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 278 days.

(21) Appl. No.: 18/282,479

(22) PCT Filed: Mar. 4, 2022

(86) PCT No.: PCT/JP2022/009333
§ 371 (c)(1),
(2) Date: Sep. 15, 2023

(87) PCT Pub. No.: WO2022/202210
PCT Pub. Date: Sep. 29, 2022

(65) Prior Publication Data

US 2024/0154361 A1 May 9, 2024

(30) Foreign Application Priority Data

Mar. 23, 2021 (JP) ................................ 2021-048359

(51) Int. Cl.
*H01R 13/629* (2006.01)
*H01R 13/631* (2006.01)

(52) U.S. Cl.
CPC ..... *H01R 13/62955* (2013.01); *H01R 13/631* (2013.01)

(58) Field of Classification Search
CPC ............ H01R 13/62955; H01R 13/631; H01R 13/465; H01R 13/6295; H01R 13/641; H01R 43/26
See application file for complete search history.

(56) References Cited

U.S. PATENT DOCUMENTS 4,811,002 A 3/1989 Otsubo
9,583,860 B1 * 2/2017 DeWitte ............... H01R 13/436
(Continued)

FOREIGN PATENT DOCUMENTS

JP 2006-351275 A 12/2006

OTHER PUBLICATIONS

International Search Report issued on Apr. 12, 2022 for WO 2022/202210 A1 (4 pages).

*Primary Examiner* — Abdullah A Riyami
*Assistant Examiner* — Nader J Alhawamdeh
(74) *Attorney, Agent, or Firm* — Venjuris, P.C.

(57) ABSTRACT

A lever-type connector 1 includes: a connector housing 10 that has a first code arrangement surface 15S1 and is configured to be fitted with a partner connector 50; a lever 20 configured to be attached so as to be rotatable from a fitting start position to a fitting completion position with respect to the connector housing 10, and having a second code arrangement surface 26S1 configured to be arranged on the same plane as the first code arrangement surface 15S1 when the lever 20 is at the fitting completion position; a first divided code 40A arranged on the first code arrangement surface 15S1; and a second divided code 40B arranged on the second code arrangement surface 26S1. When the lever 20 is at the fitting completion position, the first divided code 40A and the second divided code 40B are adjacent to each other to form a two-dimensional code 40.

6 Claims, 12 Drawing Sheets

(56) References Cited

U.S. PATENT DOCUMENTS

| | | | | |
|---|---|---|---|---|
| 9,748,693 | B1 * | 8/2017 | Exenberger ...... | H01R 13/62955 |
| 11,522,315 | B2 * | 12/2022 | Moreau ................ | H01R 13/516 |
| 2007/0207648 | A1 * | 9/2007 | Fukatsu ........... | H01R 13/62938<br>439/157 |
| 2015/0318640 | A1 | 11/2015 | Gibeau | |
| 2017/0229813 | A1 * | 8/2017 | Exenberger ...... | H01R 13/62977 |
| 2018/0226744 | A1 | 8/2018 | Matsuura et al. | |
| 2021/0111519 | A1 | 4/2021 | Schneider et al. | |
| 2021/0143579 | A1 * | 5/2021 | Moreau .............. | H01R 13/6275 |
| 2024/0154361 | A1 * | 5/2024 | Saito .................. | H01R 13/6295 |
| 2024/0162659 | A1 * | 5/2024 | Saito .................... | H01R 13/641 |

* cited by examiner

LEVER-TYPE CONNECTOR

CROSS REFERENCE TO RELATED APPLICATIONS

This application is a national phase of PCT application No. PCT/JP2022/009333, filed on 4 Mar. 2022, which claims priority from Japanese patent application No. 2021-048359, filed on 23 Mar. 2021, all of which are incorporated herein by reference.

TECHNICAL FIELD

The technique disclosed by the present specification relates to a lever-type connector.

BACKGROUND

Conventionally, a connector is known that has a fitting detection function for detecting whether or not a male housing and a female housing are properly fitted with each other. As such a connector, a connector has been proposed in which marks composed of a plurality of linear protrusions and recesses are disposed on the surfaces of the male housing and the female housing, respectively. The surface of each protrusion is polished to have a different light reflectance from the other surfaces of the housing. After the male housing and the female housing are fitted together, the light sensor detects reflected light from each protrusion. By analyzing the data of the detected reflected light, it is determined whether or not the two housings are properly fitted together (see Patent Document 1).

PRIOR ART DOCUMENT

Patent Document

Patent Document 1: JP S63-225480 A

SUMMARY OF THE INVENTION

Problems to be Solved

It is conceivable to record that the two connectors are properly fitted together by reading, with a reading device, the marks provided on the two connectors to be fitted to each other using the above configuration. However, in the above configuration, there is concern that the acquired data of the reflected light from the protrusions will become unstable due to manufacturing tolerances in the shapes of the protrusions, molding defects during manufacturing, chipping of the protrusions after manufacturing, rattling that occurs when fitting together the housings, and the like.

Means to Solve the Problem

A lever-type connector disclosed by the present embodiment includes: a connector housing that has a first code arrangement surface and is configured to be fitted with a partner connector; a lever configured to be attached so as to be rotatable from a fitting start position to a fitting completion position with respect to the connector housing, and having a second code arrangement surface configured to be arranged on the same plane as the first code arrangement surface when the lever is at the fitting completion position; a first divided code arranged on the first code arrangement surface; and a second divided code arranged on the second code arrangement surface, in which when the lever is at the fitting completion position, the first divided code and the second divided code are adjacent to each other and form a two-dimensional code.

Effect of the Invention

According to the lever-type connector disclosed by this specification, it is possible to accurately record that the lever-type connector has been properly fitted with the partner connector.

DETAILED DESCRIPTION TO EXECUTE THE INVENTION

Figure 1:
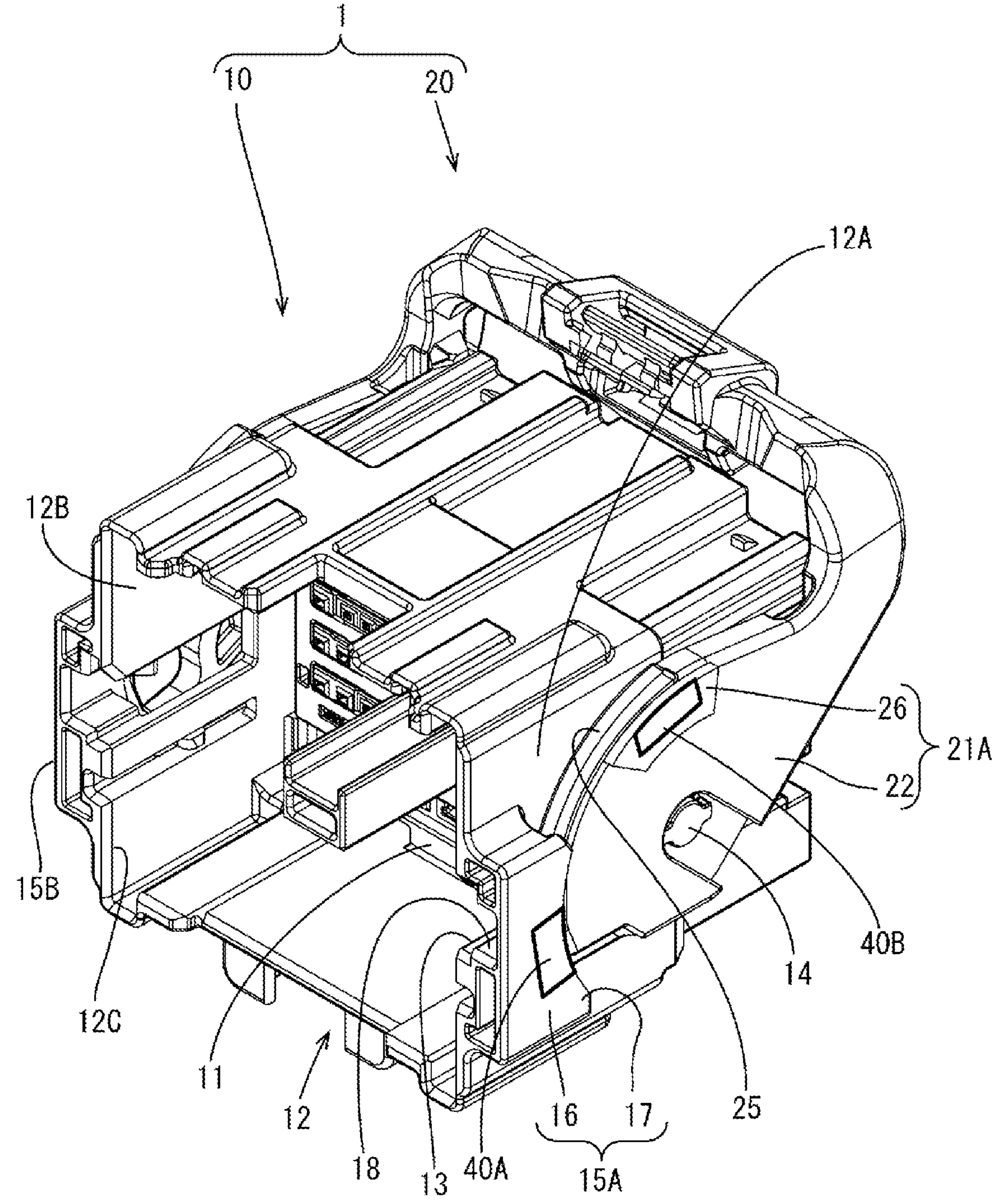
FIG. 1 is a perspective view of a lever-type connector of an embodiment.

Overview of Embodiment (1) A lever-type connector disclosed by the present embodiment includes: a connector housing that has a first code arrangement surface and is configured to be fitted with a partner connector; a lever configured to be attached so as to be rotatable from a fitting start position to a fitting completion position with respect to the connector housing, and having a second code arrangement surface configured to be arranged on the same plane as the first code arrangement surface when the lever is at the fitting completion position; a first divided code arranged on the first code arrangement surface; and a second divided code arranged on the second code arrangement surface, in which when the lever is at the fitting completion position, the first divided code and the second divided code are adjacent to each other and form a two-dimensional code.

According to the above configuration, the two-dimensional code can be read when the lever is at the fitting completion position, and therefore it is possible to accurately record that the lever-type connector has been properly fitted with the partner connector.

(2) In the lever-type connector of (1) above, both the first code arrangement surface and the second code arrangement surface may be surfaces that are visible from the outside in both a state where the lever is at the fitting start position and a state where the lever is at the fitting completion position.

According to such a configuration, the first divided code arranged on the first code arrangement surface and the second divided code arranged on the second code arrangement surface are always visible, and therefore, by visually confirming whether or not the positions of the first divided code and the second divided code are shifted from each other, it is possible to determine whether or not the fitting between the lever-type connector and the partner connector is complete, and the task of fitting the lever-type connector and the partner connector can be performed more smoothly.

(3) In the lever-type connector of (1) or (2) above, one of the connector housing and the lever may include a lock portion, and the other may include a lock receiving portion configured to hold the lever at the fitting completion position by engaging with the lock portion when the lever is at the fitting completion position.

According to such a configuration, the first divided code and the second divided code are inhibited from undergoing a positional shift due to rattling of the lever with respect to the connector housing in the direction of rotation to the fitting start position. This avoids a situation in which the two-dimensional code cannot be read even though the lever is at the fitting completion position.

(4) In the lever-type connector of any one of (1) to (3) above, the connector housing includes a first corner portion formed by the first code arrangement surface and a first opposing surface adjacent to the first code arrangement surface, the first corner portion having an angular shape, and the lever includes a second corner portion formed by the second code arrangement surface and a second opposing surface that is adjacent to the second code arrangement surface and is configured to come into contact with the first opposing surface when the lever is at the fitting completion position, the second corner portion having an angular shape.

According to such a configuration, when the lever is at the fitting completion position, the first code arrangement surface and the second code arrangement surface are adjacent to each other without a gap, and therefore the first divided code and the second divided code are adjacent to each other without a gap and form the two-dimensional code. This makes it possible to reliably read the two-dimensional code.

Detailed Embodiments

A specific example of the technique disclosed in this specification will be described below with reference to the drawings. Note that the present invention is not limited to these illustrations, but is indicated by the scope of the claims, and all modifications within the scope and meaning equivalent to the scope of the claims are intended to be encompassed therein.

Embodiment

An embodiment will be described with reference to FIGS. 1 to 12. A lever-type connector 1 of the present embodiment is a connector that fits with a partner connector 50 having cam followers 52, and as shown in FIG. 1, includes a connector housing 10, and a lever 20 attached to the connector housing 10.

Connector Housing 10

Figure 2:
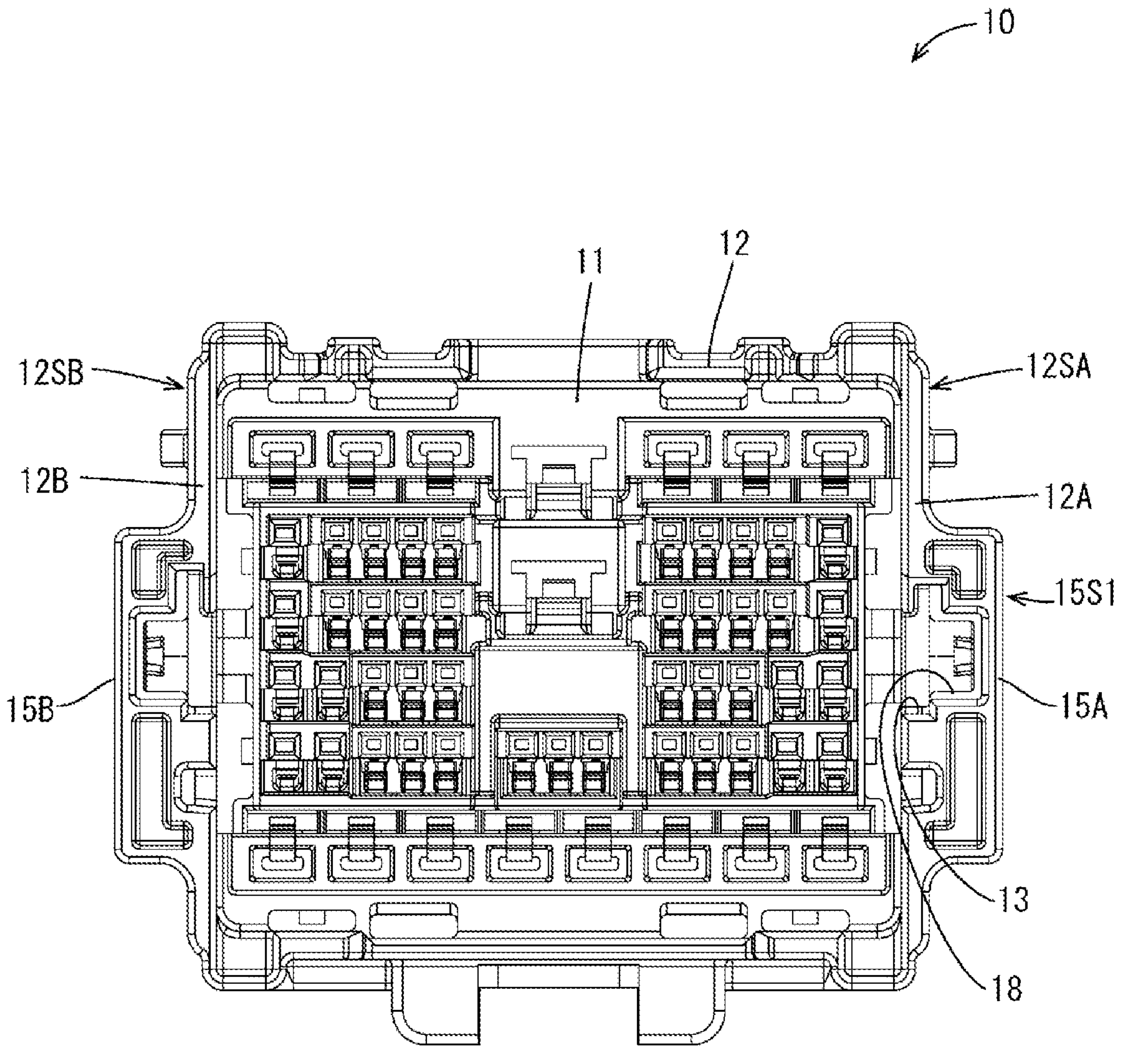
FIG. 2 is a front view of a connector housing of the embodiment.
Figure 3:
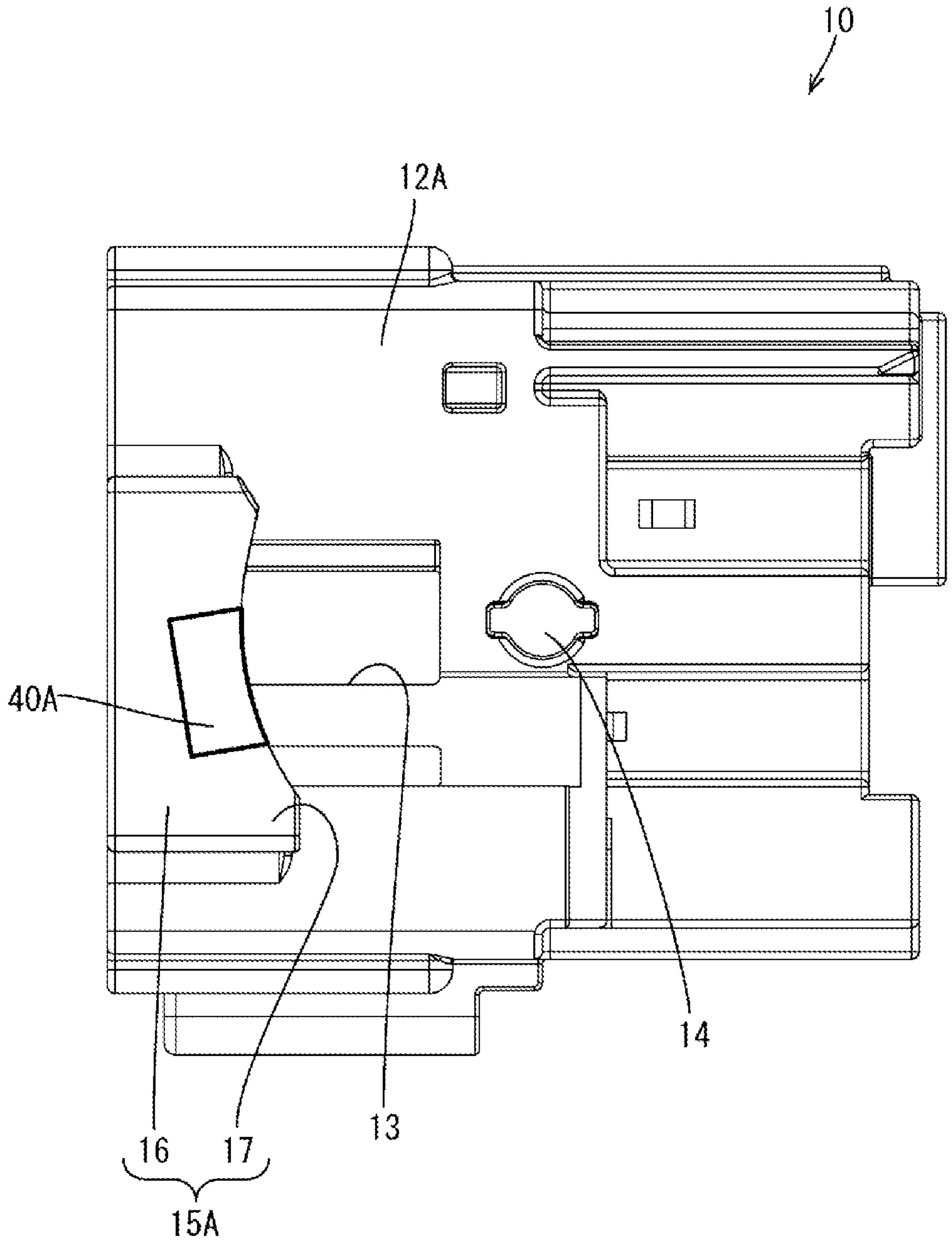
FIG. 3 is a side view of the connector housing of the embodiment.

The connector housing 10 is made of synthetic resin and, as shown in FIG. 1, includes a block-shaped first terminal holding portion 11 for holding terminal fittings, a rectangular tube-shaped hood portion 12 that extends from the first terminal holding portion 11 and inside of which the partner connector 50 is received, and two rotation shafts 14. As shown in FIGS. 1 and 2, the hood portion 12 has two attachment walls 12A and 12B that are parallel to each other. The outer surfaces of the two attachment walls 12A, 12B are attachment surfaces 12SA, 12SB, respectively. As shown in FIG. 1, the hood portion 12 has a connector entry port 12C into which the partner connector 50 can enter. As shown in FIGS. 1 and 3, the two attachment walls 12A, 12B each have a receiving groove 13 that extends from the edge of the connector entry port 12C and through which a corresponding cam follower 52 of the partner connector 50 is inserted. As shown in FIGS. 1 and 3, the two rotation shafts 14 are substantially cylindrical and are respectively arranged on the two attachment surfaces 12SA, 12SB.

Lever 20

Figure 4:
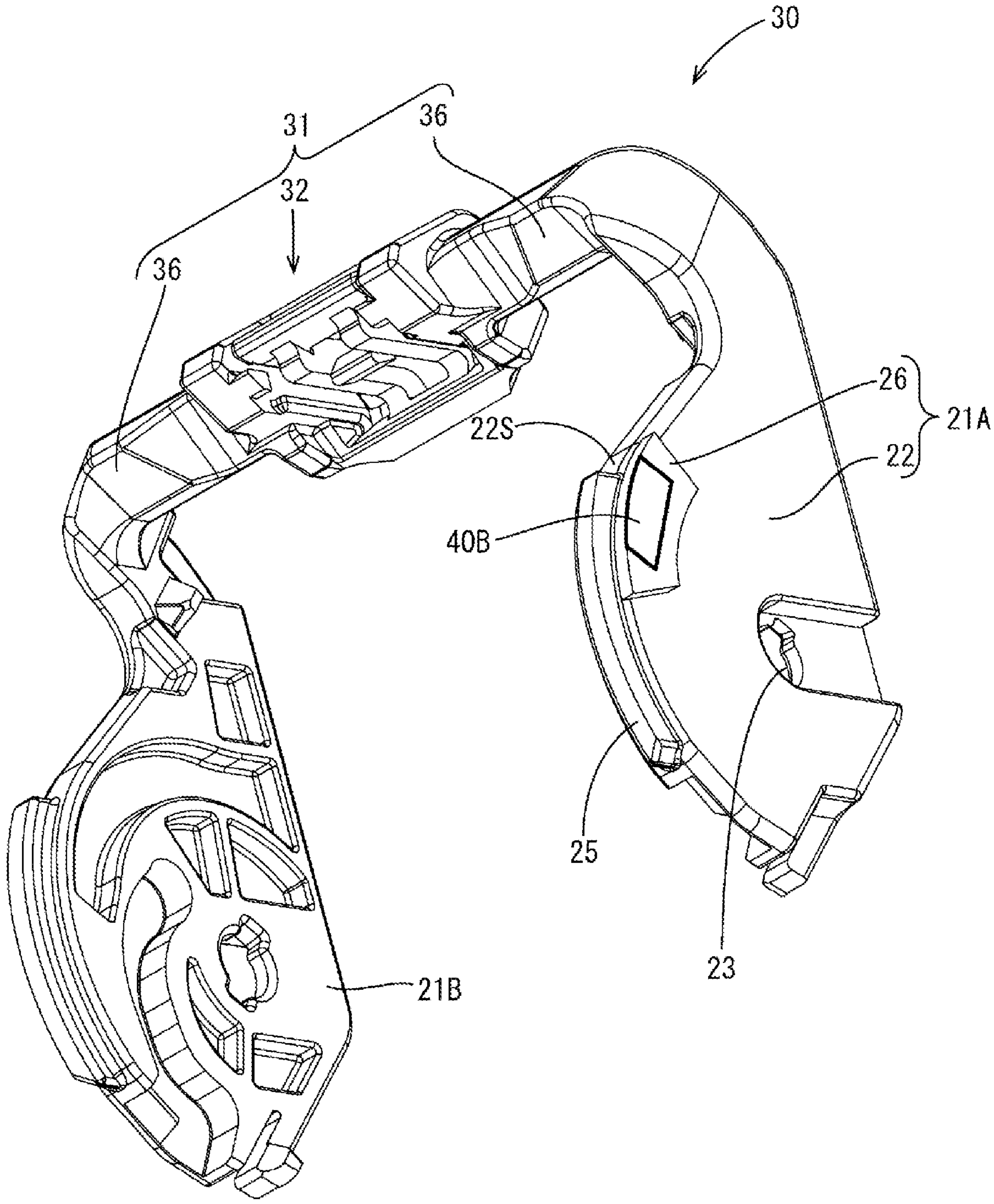
FIG. 4 is a perspective view of the lever of the embodiment.

The lever 20 is a member for assisting fitting and disengagement between the connector housing 10 and the partner connector 50 through the principle of leverage. The lever 20 is made of synthetic resin and, as shown in FIG. 4, is an approximately U-shaped member that includes two cam plates 21A, 21B, and a rotation operation portion 31 that connects these two cam plates 21A, 21B. Since the cam plate 21B has the same configuration as the cam plate 21A except that it does not have a later-described pedestal portion 26, the cam plate 21A will be described in detail, and description of the cam plate 21B is omitted.

Figure 5:
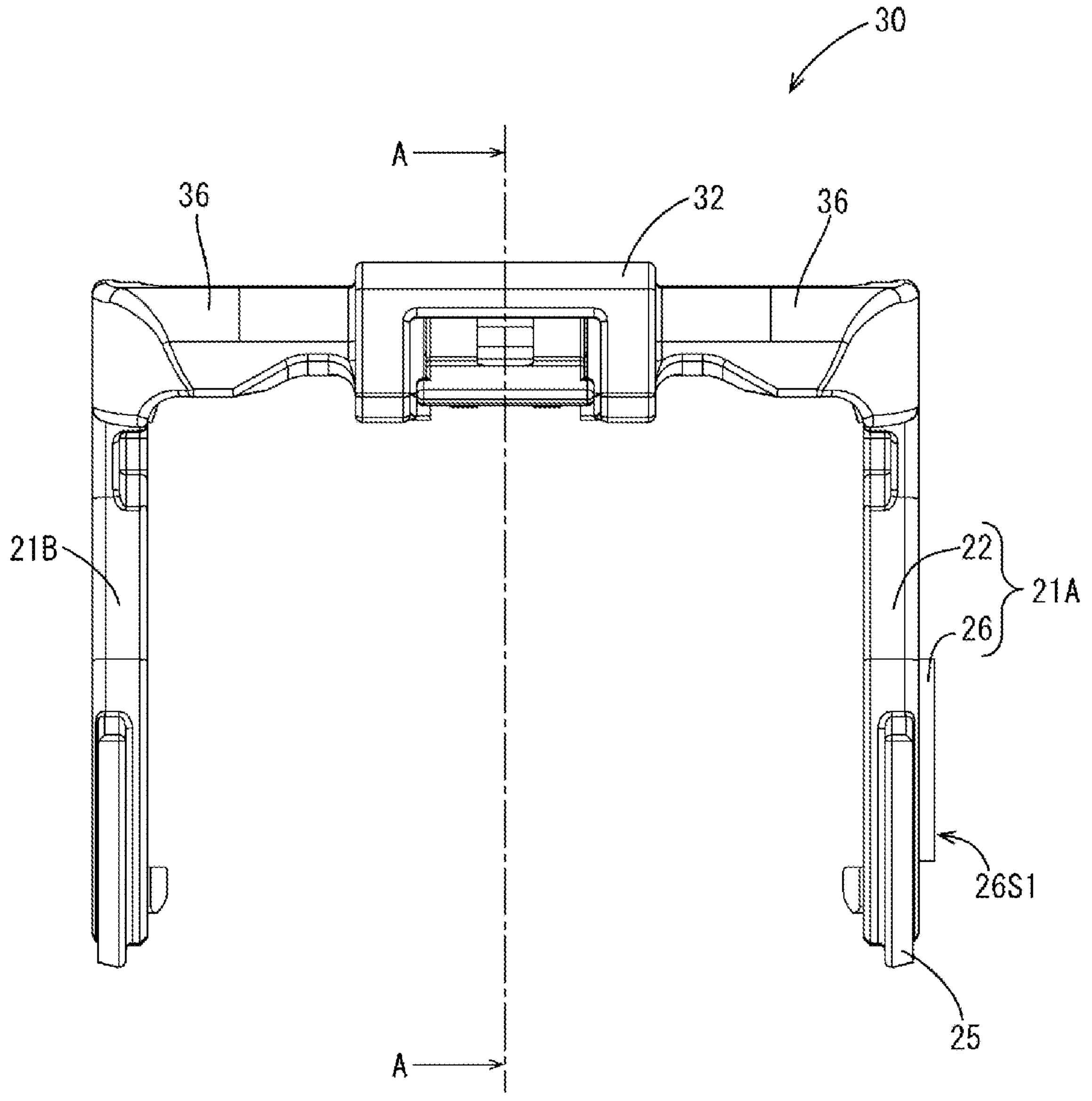
FIG. 5 is a front view of the lever of the embodiment.
Figure 6:
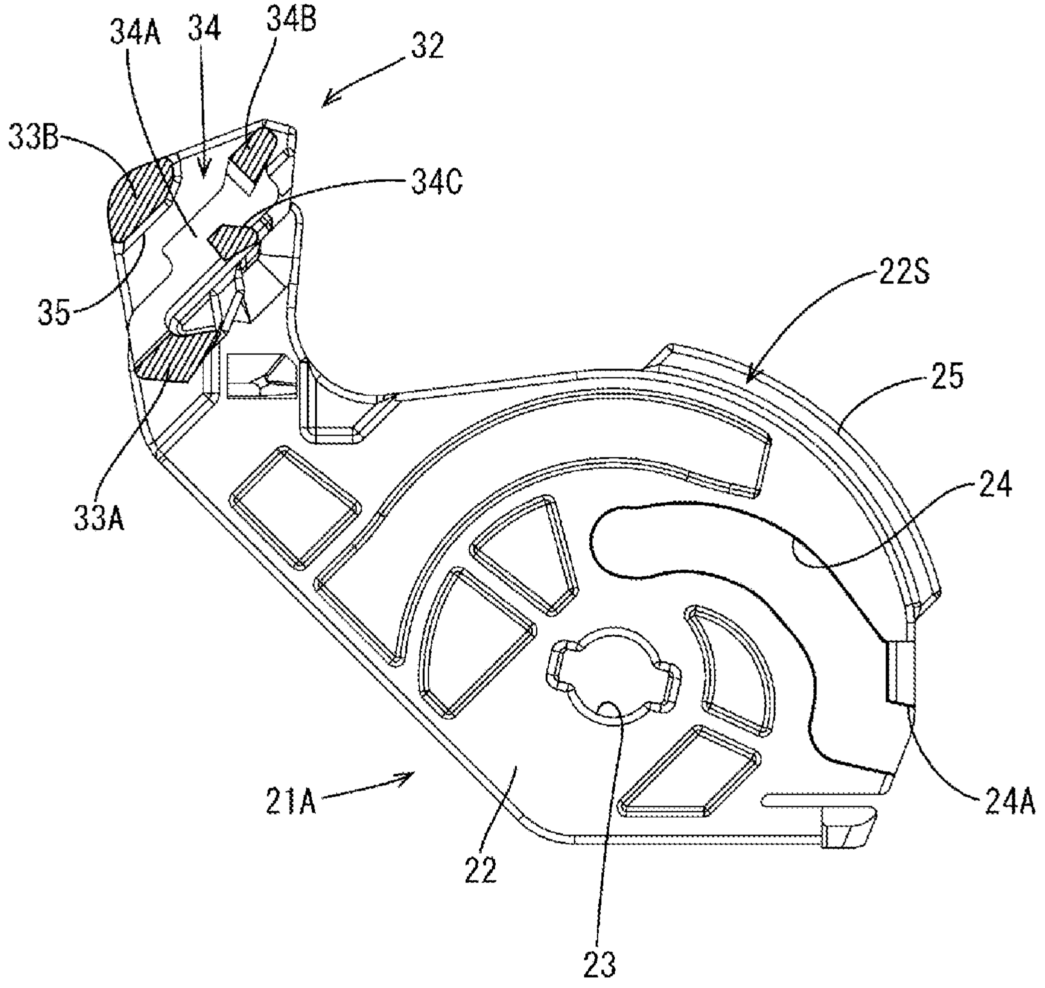
FIG. 6 is a cross-sectional view taken along line A-A of FIG. 5.

As shown in FIGS. 4, 5, and 6, the cam plate 21A includes a thick plate-shaped cam plate main body 22 and a pedestal portion 26 arranged on one surface of the cam plate main body 22. Part of the outer edge of the cam plate main body 22 is an arc surface 22S that extends in an arc shape. The cam plate main body 22 has a shaft hole 23 for receiving the corresponding rotation shaft 14 and a cam groove 24 for receiving the corresponding cam follower 52. The shaft hole 23 is a substantially circular hole passing through the cam plate main body 22. The cam groove 24 is a groove arranged on the surface of the cam plate main body 22 facing the attachment surface 12SA, and has a cam entry port 24A on the arc surface 22S that allows entry of the corresponding cam follower 52, and the cam groove 24 extends from this cam entry port 24A between the shaft hole 23 and the arc surface 22S. The cam groove 24 has a substantially arcuate shape such that it gradually approaches the shaft hole 23, which is the rotation center of the cam plate 21A, as it goes inward from the cam entry port 24A. A linear guide rib 25 protrudes from the arc surface 22S.

As shown in FIG. 4, the rotation operation portion 31 includes a lock portion 32 and two joining portions 36.

As shown in FIG. 6, the lock portion 32 includes two bridge portions 33A, 33B and a lock arm 34. The two bridge portions 33A, 33B are arranged spaced apart from each other, and the space between the two bridge portions 33A, 33B is a lock space 35. The lock arm 34 includes two arm portions 34A that extend from one bridge portion 33A and are arranged spaced apart from each other, and a lock operation portion 34B and a lock beam 34C that connect the two arm portions 34A, and the lock arm 34 is arranged in the lock space 35. With the position at which the lock arm 34 is joined to the one bridge portion 33A serving as a base end, the lock arm 34 can be bent toward or away from the other bridge portion 33B.

As shown in FIGS. 4 and 5, one of the two joining portions 36 joins the lock portion 32 and one cam plate 21A to each other, and the other joins the lock portion 32 and the other cam plate 21B to each other.

The lever 20 is attached so as to straddle the connector housing 10, the cam plate 21A is arranged along the attachment surface 12SA, the cam plate 21B is arranged along the attachment surface 12SB, and the rotation shafts 14 are respectively fit in the shaft holes 23. The lever 20 is supported by the rotation shafts 14 so as to be able to rotate using the rotation shafts 14 as a rotation center, between a fitting start position (the position shown in FIGS. 1 and 9) and a fitting completion position (the position shown in FIG. 11) at which the partner connector 50 is fitted with the connector housing 10 at a proper fitting position.

Reinforcing Walls 15A, 15B

As shown in FIGS. 1 and 2, the connector housing 10 includes a reinforcing wall 15A arranged on the attachment surface 12SA and a reinforcing wall 15B arranged on the attachment surface 12SB. Since the reinforcing wall 15B has the same configuration as the reinforcing wall 15A except that it does not have a later-described first code arrangement surface 15S1, the reinforcing wall 15A will be described in detail, and description of the reinforcing wall 15B is omitted.

Figure 12:
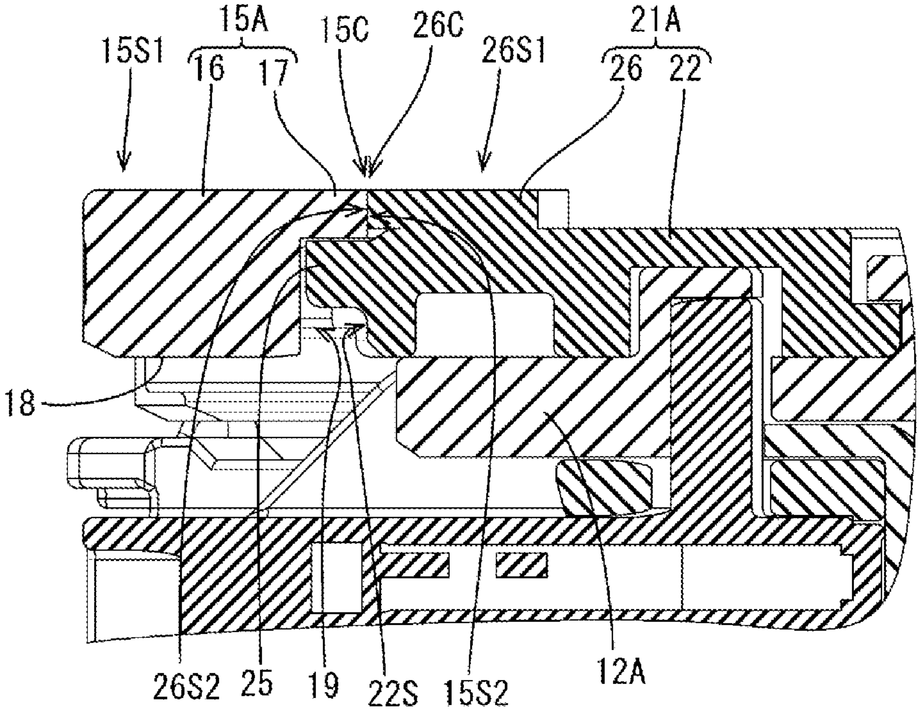
FIG. 12 is a cross-sectional view taken along line B-B of FIG. 11.

As shown in FIGS. 1, 3, and 12, the reinforcing wall 15A includes a main wall 16 and a guide receiving portion 17 extending from the main wall 16. The main wall 16 has a thick plate-like shape, is adjacent to the edge of the connector entry port 12C, and is arranged straddling the receiving groove 13. As shown in FIGS. 1 and 2, the main wall 16 has an insertion groove 18 that is in communication with the receiving groove 13 and receives the corresponding cam follower 52 of the partner connector 50. The guide receiving portion 17 is a ridge extending from the main wall 16 toward the cam plate 21A and is arranged spaced apart from the attachment wall 12A. As shown in FIG. 12, a space between the guide receiving portion 17 and the attachment surface 12SA is a guide recess 19 for receiving the guide rib 25.

As shown in FIGS. 2 and 12, the outer surface of the main wall 16 and the guide receiving portion 17 has a flat first code arrangement surface 15S1 arranged parallel to the attachment surface 12SA. The first code arrangement surface 15S1 is a surface that is visible from the outside in both the state where the lever-type connector 1 is not fitted with the partner connector 50 (the state where the lever 20 is at the fitting start position) and the state where the fitting between the lever-type connector 1 and the partner connector 50 is complete (the state where the lever 20 is at the fitting completion position).

Pedestal Portion 26

The cam plate 21A includes the pedestal portion 26. As shown in FIGS. 1 and 12, the pedestal portion 26 has a flat block shape and is arranged on the surface of the cam plate main body 22 opposite to the surface thereof facing the attachment surface 12SA. The outer surface of the pedestal portion 26 has a flat second code arrangement surface 26S1 arranged on the same plane as the first code arrangement surface 15S1. The second code arrangement surface 26S1 is a surface that is visible from the outside in both the state where the lever-type connector 1 is not fitted with the partner connector 50 (the state where the lever 20 is at the fitting start position) and the state where the fitting between the lever-type connector 1 and the partner connector 50 is complete (the state where the lever 20 is at the fitting completion position).

Two-Dimensional Code 40

Figure 11:
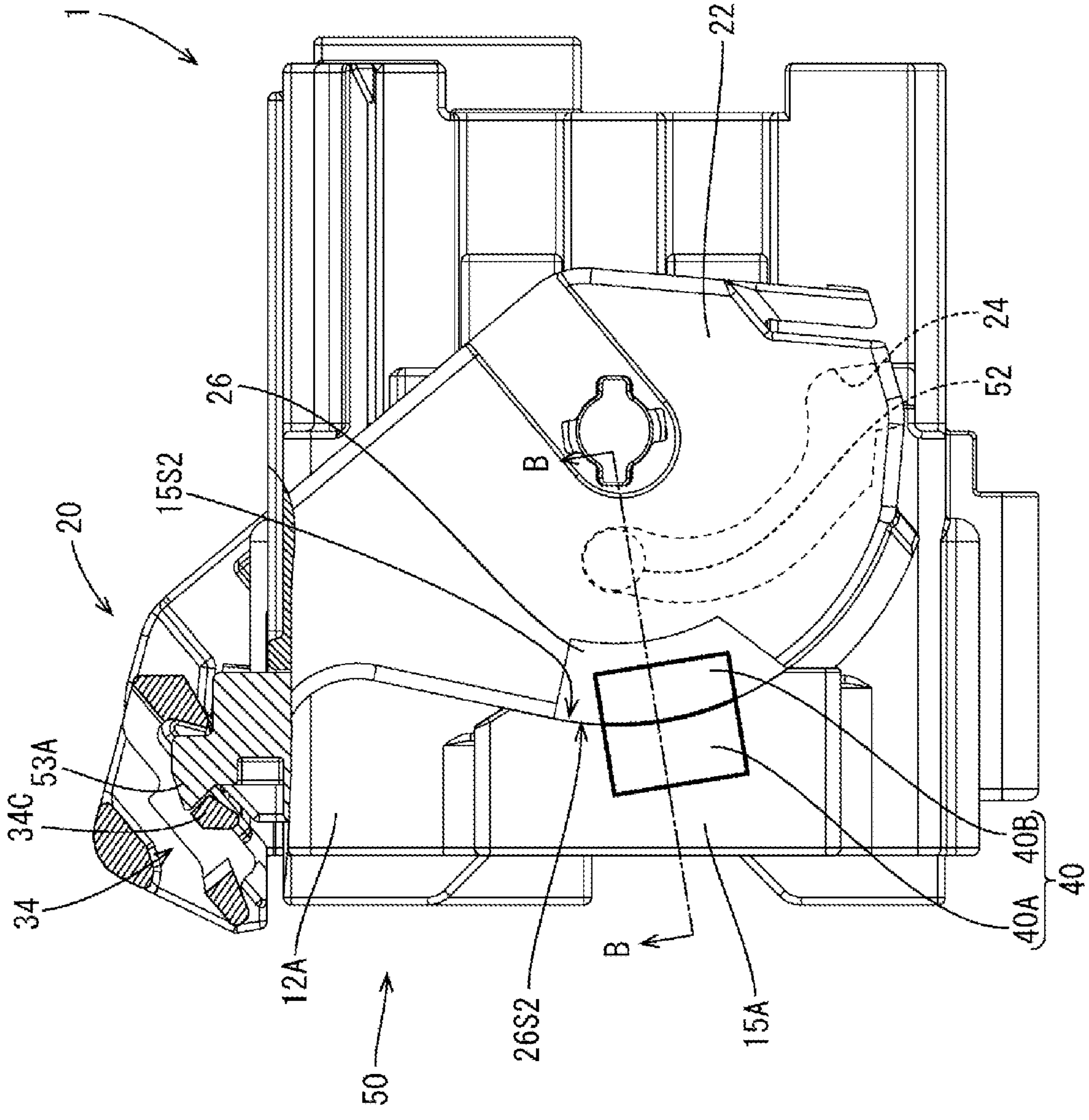
FIG. 11 is a side view partially cut away at the same position as line A-A in FIG. 5, showing a state where the fitting of the lever-type connector and the partner connector of the embodiment is complete.

A two-dimensional code 40 is arranged on the first code arrangement surface 15S1 and the second code arrangement surface 26S1. As shown in FIG. 11, the two-dimensional code 40 is divided into a first divided code 40A and a second divided code 40B. The first divided code 40A is arranged on the first code placement surface 15S1, and the second divided code 40B is arranged on the second code arrangement surface 26S1. As described above, since the first code arrangement surface 15S1 and the second code arrangement surface 26S1 are surfaces that are visible from the outside in both the state where the lever 20 is at the fitting start position and the state where the lever 20 is at the fitting completion position, the first divided code 40A and the second divided code 40B are visible from the outside in both the state where the lever 20 is at the fitting start position and the state where the lever 20 is at the fitting completion position. In the present embodiment, the boundary line between the first code arrangement surface 15S1 and the second code arrangement surface 26S1 is located at approximately the central position between the two side edges of the two-dimensional code 40 that are parallel to each other, and the two-dimensional code 40 is divided in two along this boundary line.

Figure 9:
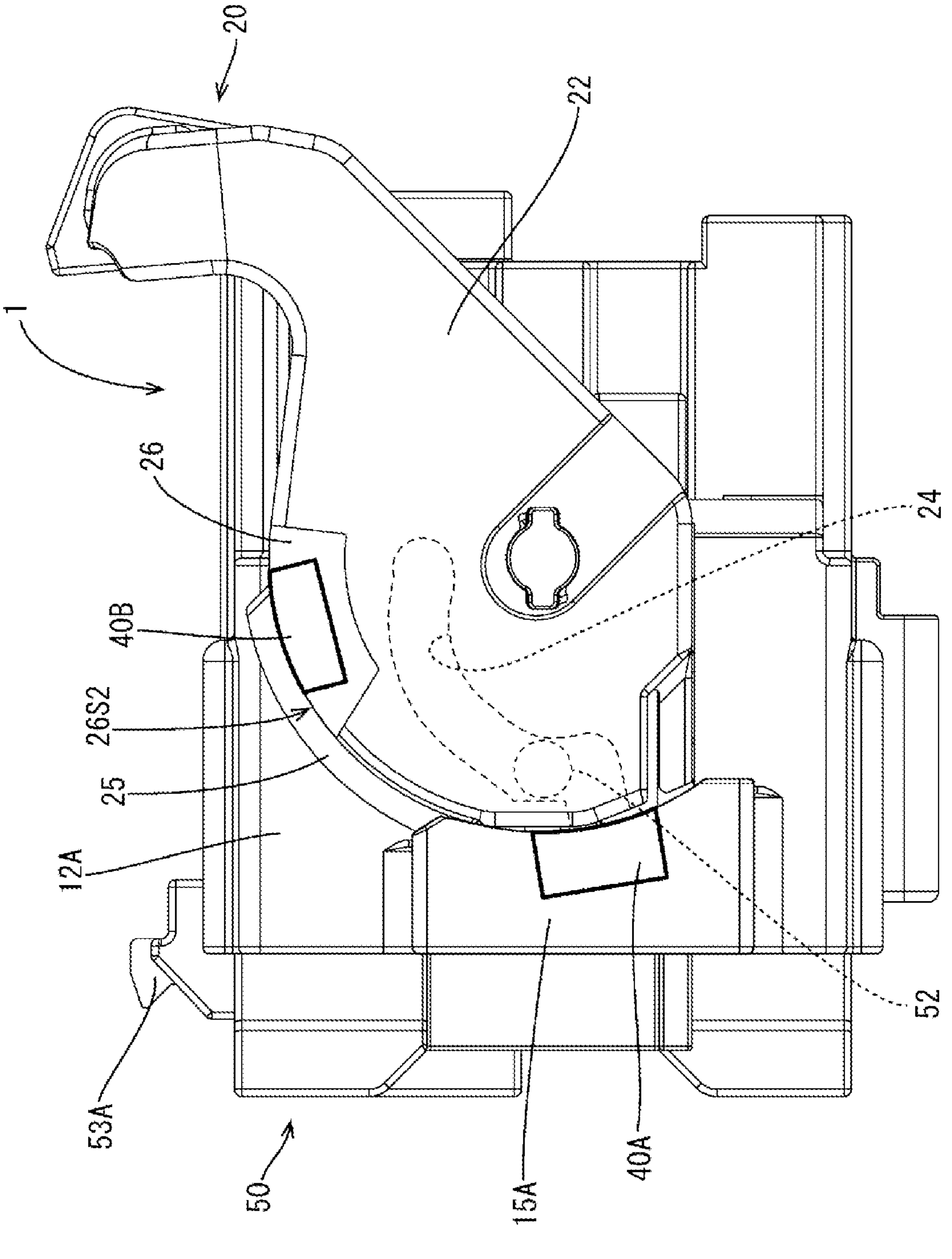
FIG. 9 is a side view showing an initial state of fitting between the lever-type connector and the partner connector of the embodiment.
Figure 10:
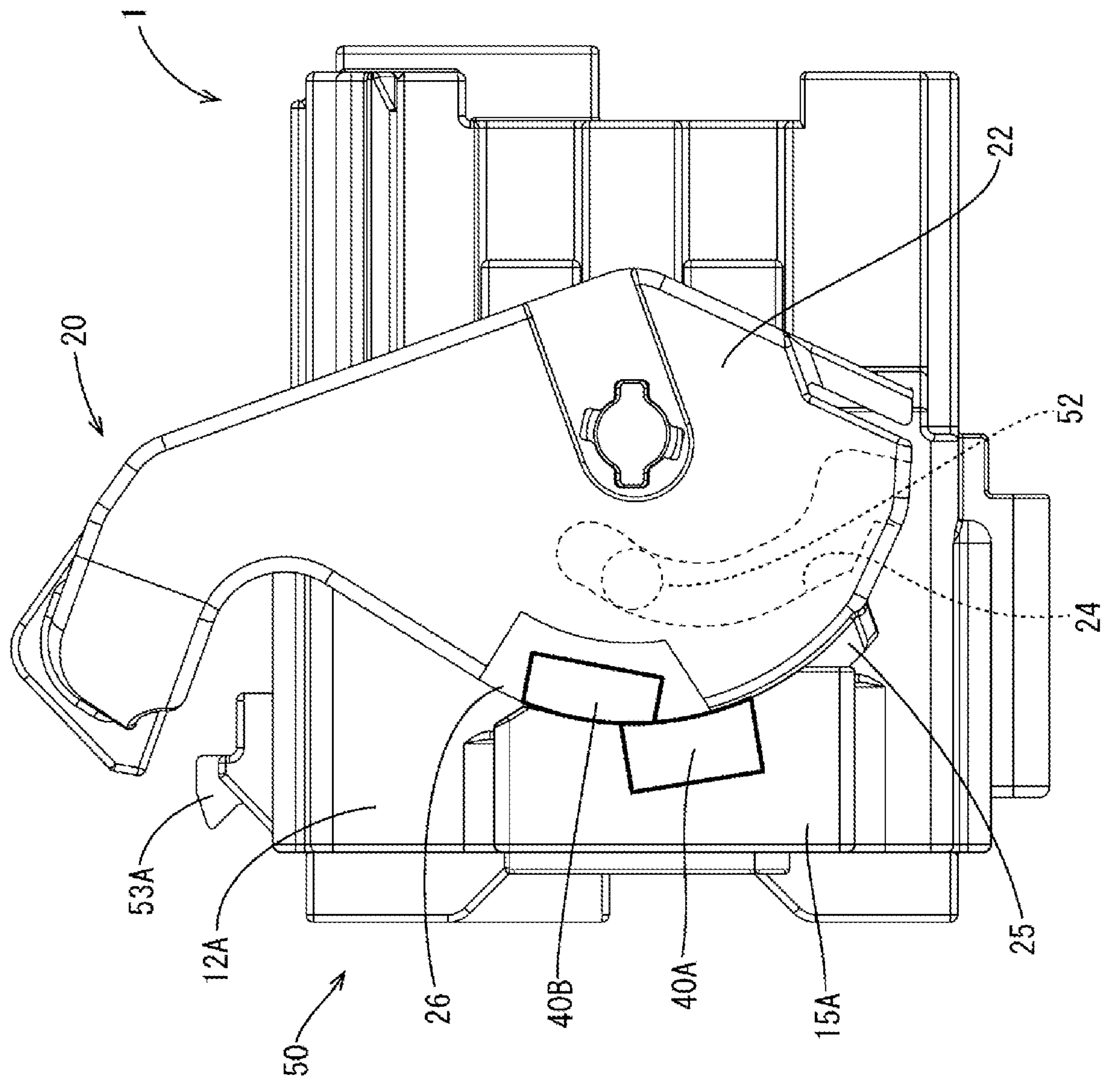
FIG. 10 is a side view showing a state in which the lever-type connector and the partner connector of the embodiment are being fitted together.

When the lever 20 is not at the fitting completion position, the pedestal portion 26 is arranged at a position shifted with respect to the reinforcing wall 15A, as shown in FIGS. 9 and 10. For this reason, the positions of the first divided code 40A and the second divided code 40B are shifted from each other and the two-dimensional code 40 is not formed.

As shown in FIG. 11, when the lever 20 is at the fitting completion position, the pedestal portion 26 is arranged adjacent to the reinforcing wall 15A, and the first code arrangement surface 15S1 and the second code arrangement surface 26S1 are flush with each other and adjacent to each other. As a result, the first divided code 40A and the second divided code 40B are adjacent to each other and form one two-dimensional code 40, which can be read by a scanning device.

The two-dimensional code 40 can be formed, for example, by performing laser printing on the surfaces of the first code arrangement surface 15S1 and the second code arrangement surface 26S1 while the lever 20 is held at the fitting completion position.

Partner Connector 50

Figure 7:
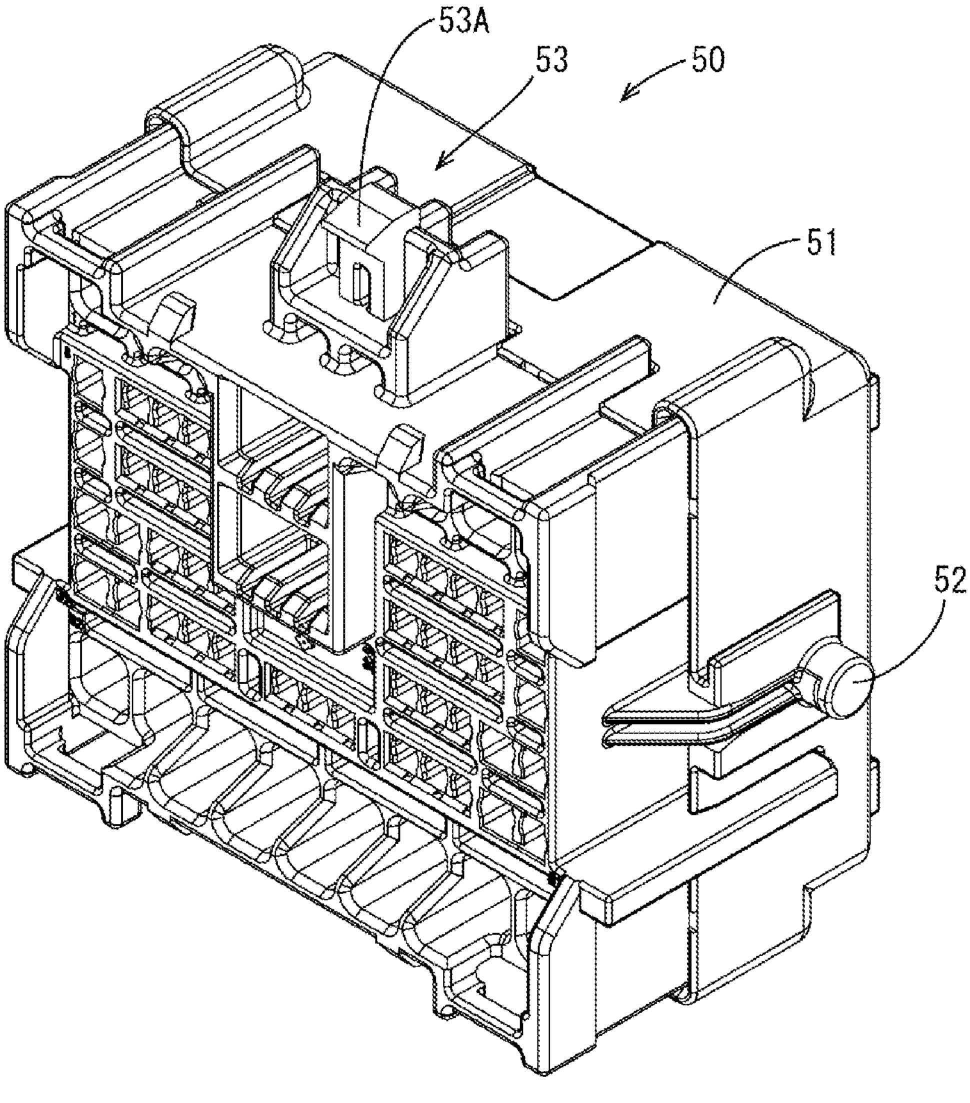
FIG. 7 is a perspective view of a partner connector of the embodiment.
Figure 8:
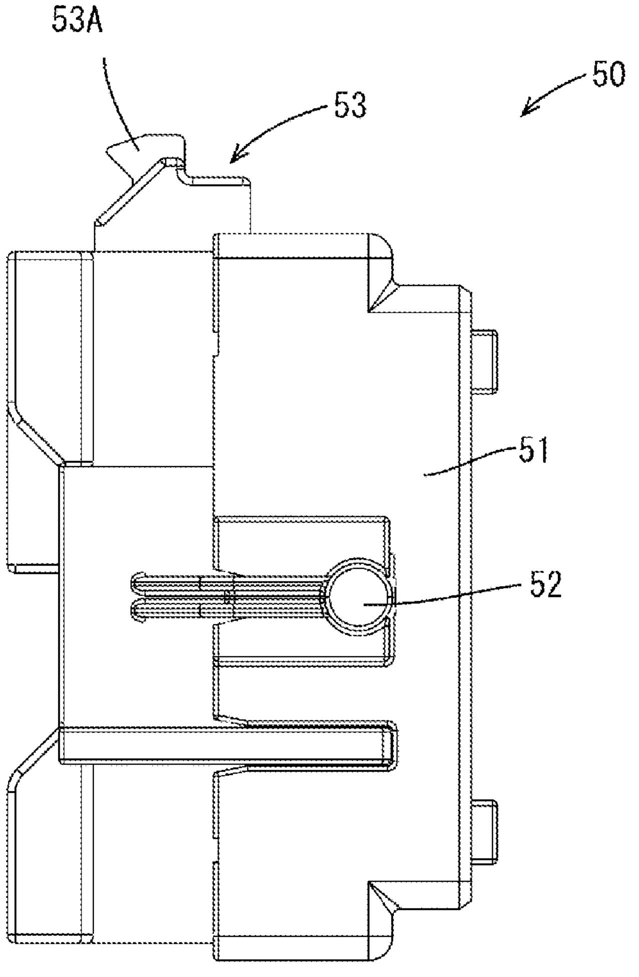
FIG. 8 is a side view of the partner connector of the embodiment.

As shown in FIGS. 7 and 8, the partner connector 50 includes a block-shaped second terminal holding portion 51 that holds partner terminal fittings, and two cam followers 52 arranged on the outer surface of the second terminal holding portion 51. The partner connector 50 has a lock receiving portion 53. The lock receiving portion 53 includes a lock claw 53A that engages with the lock arm 34.

Fitting Between Lever-Type Connector 1 and Partner Connector 50

When the lever-type connector 1 is fitted with the partner connector 50, the lever 20 assists the operation of fitting with the partner connector 50 by relatively drawing the partner connector 50 to the connector housing 10 due to the cam action between the cam grooves 24 and the cam followers 52 as the lever 20 is rotated from the fitting start position to the fitting completion position.

First, the lever-type connector 1 is shallowly fitted with the partner connector 50 while the lever 20 is held at the fitting start position. As shown in FIG. 9, the cam followers 52 enter the cam grooves 24.

Next, as shown in FIG. 10, the lever 20 is rotated from the fitting start position toward the fitting completion position. The rotation of the lever 20 is guided by the movement of the guide rib 25 inside the guide recess 19 as the lever 20 rotates. As the lever 20 rotates, the connector housing 10 is relatively drawn to the partner connector 50 by the cam action based on the engagement between the cam follower 52 and the cam groove 24. Also, as the lever 20 rotates, the pedestal portion 26 rotates in a direction approaching the reinforcing wall 15A, and the second divided code 40B rotates in a direction approaching the first divided code 40A.

When the lever 20 approaches the fitting completion position, the lock beam 34C of the lock arm 34 rides up on the lock claw 53A, whereby the lock arm 34 is bent. When the lever 20 reaches the fitting completion position, the connector housing 10 reaches the proper fitting position with respect to the partner connector 50, as shown in FIG. 11. Also, the lever 20 is held at the fitting completion position due to the lock beam 34C going over the lock claw 53A, the lock arm 34 being elastically restored, and the lock beam 34C engaging with the lock claw 53A.

When the lever 20 reaches the fitting completion position, the first divided code 40A and the second divided code 40B are adjacent to each other and form one two-dimensional code 40. By reading this two-dimensional code 40 with a scanning device, completion of fitting is recorded in a recording device.

Here, as shown in FIG. 12, in the reinforcing wall 15A, a first corner portion 15C formed by the first code arrangement surface 15S1 and a first opposing surface 15S2 that is adjacent to the first code arrangement surface 15S1 and opposes the pedestal portion 26 has an angular shape without roundness. Similarly, in the pedestal portion 26, a second corner portion 26C formed by the second code arrangement surface 26S1 and a second opposing surface 26S2 that is adjacent to the second code arrangement surface 26S1 and opposes the reinforcing wall 15A has an angular shape without roundness. As shown in FIGS. 11 and 12, when the lever 20 is at the fitting completion position, the first opposing surface 15S2 and the second opposing surface 26S2 are in contact with each other, the first code arrangement surface 15S1 and the second code arrangement surface 26S1 are flush with each other and are in contact with each other without any gap, and the first divided code 40A and the second divided code 40B are adjacent to each other without any gap and form the two-dimensional code 40. As a result, the two-dimensional code 40 can be reliably read.

When the lever 20 reaches the fitting completion position, the lock arm 34 is engaged with the lock receiving portion 53, whereby the lever 20 is inhibited from rattling in a direction of rotating to the fitting start position with respect to the connector housing 10. Also, the guide rib 25 is received inside the guide recess 19 and comes into contact with the guide receiving portion 17, whereby rattling is suppressed in a direction in which the cam plate 21A moves away from the attachment surface 12SA, that is, in a direction in which the first code arrangement surface 15S1 and the second code arrangement surface 26S1 are shifted from the same plane. This avoids a situation in which the two divided codes 40A and 40B undergo a positional shift and the two-dimensional code 40 cannot be read even though the lever 20 is at the fitting completion position.

Operations and Effects

As described above, according to the present embodiment, the lever-type connector 1 includes: the connector housing 10 that has the first code arrangement surface 15S1 and is to be fitted with the partner connector 50; the lever 20 that is to be attached to the connector housing 10 so as to be rotatable from the fitting start position to the fitting completion position and has the second code arrangement surface 26S1 that is arranged on the same plane as the first code arrangement surface 15S1 when the lever 20 is at the fitting completion position; the first divided code 40A arranged on the first code arrangement surface 15S1; and the second divided code 40B arranged on the second code arrangement surface 26S1, in which when the lever 20 is at the fitting completion position, the first divided code 40A and the second divided code 40B are adjacent to each other and form the two-dimensional code 40.

According to the above configuration, since the two-dimensional code 40 can be read when the lever 20 is at the fitting completion position, it is possible to accurately record that the lever-type connector 1 has been properly fitted with the partner connector 50.

Also, both the first code arrangement surface 15S1 and the second code arrangement surface 26S1 are surfaces that are visible from the outside in both the state where the lever 20 is at the fitting start position and the state where the lever 20 is at the fitting completion position.

According to such a configuration, the first divided code 40A arranged on the first code arrangement surface 15S1 and the second divided code 40B arranged on the second code arrangement surface 26S1 are always visible, and therefore by visually confirming whether or not the positions of the first divided code 40A and the second divided code 40B are shifted from each other, it is possible to determine whether or not the fitting between the lever-type connector 1 and the partner connector 50 is complete, and it is possible to more smoothly perform the fitting operation between the lever-type connector 1 and the partner connector 50.

Also, the lever 20 includes the lock portion 32, and the connector housing 10 includes the lock receiving portion 53 configured to engage with the lock portion 32 when the lever 20 is at the fitting completion position.

According to such a configuration, the lever 20 is inhibited from rattling in a direction of rotating to the fitting start position with respect to the connector housing 10, and the first divided code 40A and the second divided code 40B are inhibited from undergoing a positional shift with respect to each other. This avoids a situation in which the two-dimensional code 40 cannot be read even though the lever 20 is at the fitting completion position.

Also, the connector housing 10 has a first corner portion 15C formed by the first code arrangement surface 15S1 and the first opposing surface 15S2 adjacent to the first code arrangement surface 15S1, the first corner portion 15C having an angular shape, and the lever 20 has a second corner portion 26C formed by the second code arrangement surface 26S1 and a second opposing portion 26C that is adjacent to the second code arrangement surface 26S1 and is configured to come into contact with the first opposing surface 15S2 when the lever 20 is at the fitting completion position, the second corner portion 26C having an angular shape.

According to such a configuration, when the lever 20 is at the fitting completion position, the first code arrangement surface 15S1 and the second code arrangement surface 26S1 are adjacent to each other without any gap, and therefore the first divided code 40A and the second divided code 40B are adjacent to each other without any gap and form the two-dimensional code 40. As a result, the two-dimensional code 40 can be reliably read.

Other Embodiments (1) In the above embodiment, the two-dimensional code 40 was divided into two at approximately the central position between the two side edges parallel to each other, but there is no particular limitation on the division position of the two-dimensional code, and it may be divided at any position according to the shape or the like of the part where the two-dimensional code is arranged.

(2) In the above embodiment, the two-dimensional code was formed by laser printing, but for example, seals on which the first divided code and the second divided code are printed may also be respectively adhered to the first code arrangement surface and the second code arrangement surface.

(3) In the above embodiment, the cam plate 21A included the pedestal portion 26 having the second code arrangement surface 26S1, but for example, the cam plate need not include the pedestal portion and the outer surface of the cam plate main body may also include the second code arrangement surface.

LIST OF REFERENCE NUMERALS

1 Lever-type connector
10 Connector housing
11 First terminal holding portion
12 Hood portion
12A, 12B Attachment wall
12C Connector entry port
12SA, 12SB Attachment surface
13 Receiving groove
14 Rotation shaft
15A, 15B Reinforcing wall
15C First corner portion
15S1 First code arrangement surface
15S2 First opposing surface
16 Main wall
17 Guide receiving portion
18 Insertion groove
19 Guide recess
20 Lever
21A, 21B Cam plate
22 Cam plate main body
22S Arc surface
23 Shaft hole
24 Cam groove
24A Cam entry port
25 Guide rib
26 Pedestal portion
26C Second corner portion
26S1 Second code arrangement surface
26S2 Second opposing surface
31 Rotation operation portion
32 Lock portion
33A, 33B Bridge portion
34 Lock arm
34A Arm portion
34B Lock operation portion
34C Lock beam
35 Lock space
36 Joining portion
40 Two-dimensional code
40A First divided code
40B Second divided code
50 Partner connector
51 Second terminal holding portion
52 Cam follower
53 Lock receiving portion
53A Lock claw

What is claimed is:

1. A lever-type connector comprising:
a connector housing having a first code arrangement surface and fitted with a partner connector;
a lever attached so as to be rotatable from a fitting start position to a fitting completion position with respect to the connector housing, and having a second code arrangement surface configured to be arranged on the same plane as the first code arrangement surface when the lever is at the fitting completion position;
a first divided code arranged on the first code arrangement surface; and
a second divided code arranged on the second code arrangement surface,
wherein when the lever is at the fitting completion position, the first divided code and the second divided code become adjacent to each other without a gap therebetween, thereby forming a single two-dimensional code.

2. The lever-type connector according to claim 1, wherein both the first code arrangement surface and the second code arrangement surface are surfaces that are visible from the outside in both a state where the lever is at the fitting start position and a state where the lever is at the fitting completion position.

3. The lever-type connector according to claim 1, wherein one of the connector housing and the lever includes a lock portion, and the other includes a lock receiving portion configured to hold the lever at the fitting completion position by engaging with the lock portion when the lever is at the fitting completion position.

4. The lever-type connector according to claim 1,
wherein the connector housing includes a first corner portion formed by the first code arrangement surface and a first opposing surface adjacent to the first code arrangement surface, the first corner portion having an angular shape, and
the lever includes a second corner portion formed by the second code arrangement surface and a second opposing surface that is adjacent to the second code arrangement surface and is configured to come into contact with the first opposing surface when the lever is at the fitting completion position, the second corner portion having an angular shape.

5. The lever-type connector according to claim 1, wherein the two-dimensional code is formed by performing a laser printing on the first code arrangement surface and the second code arrangement surface while the lever is held at the fitting completion position.

6. The lever-type connector according to claim 1, wherein a boundary line between the first code arrangement surface and the second code arrangement surface is located at a substantially central position between two side edges of the two-dimensional code that are parallel to each other.

* * * * *